US010042325B2

(12) United States Patent
Cheng et al.

(10) Patent No.: US 10,042,325 B2
(45) Date of Patent: Aug. 7, 2018

(54) IMAGE PROCESSING METHOD

(71) Applicant: NATIONAL TAIWAN NORMAL UNIVERSITY, Taipei (TW)

(72) Inventors: Chau-Jern Cheng, Taipei (TW); Yu-Chih Lin, Taipei (TW); Xin-Ji Lai, Taipei (TW)

(73) Assignee: National Taiwan Normal University, Taipei (TW)

( * ) Notice: Subject to any disclaimer, the term of this patent is extended or adjusted under 35 U.S.C. 154(b) by 347 days.

(21) Appl. No.: 14/945,636

(22) Filed: Nov. 19, 2015

(65) Prior Publication Data

US 2016/0320485 A1    Nov. 3, 2016

(30) Foreign Application Priority Data

Apr. 29, 2015    (TW) .............................. 104113746 A

(51) Int. Cl.
*G01H 1/00*     (2006.01)
*G03H 1/04*     (2006.01)
*G03H 1/08*     (2006.01)
*G03H 1/26*     (2006.01)

(52) U.S. Cl.
CPC ......... *G03H 1/0443* (2013.01); *G03H 1/0866* (2013.01); *G03H 1/265* (2013.01); *G03H 2001/0825* (2013.01)

(58) Field of Classification Search
CPC . G03H 1/0443; G03H 1/32; G03H 2001/0456
See application file for complete search history.

(56) References Cited

U.S. PATENT DOCUMENTS 5,751,243 A     5/1998   Turpin
2004/0179738 A1*  9/2004   Dai ....................... G06T 7/0002
                                                        382/218

\* cited by examiner

*Primary Examiner* — Hovhannes Baghdasaryan
(74) *Attorney, Agent, or Firm* — Birch, Stewart, Kolasch & Birch, LLP

(57) ABSTRACT

An image processing method for processing a plurality of holograms includes the steps of: performing a Fourier transform operation on the holograms to result in a plurality of corresponding spectra in a spectrum space; calculating a sum of the plurality of spectra to obtain the synthetic spectrum; multiplying the synthetic spectrum by a weight function associated with the spectrum space to obtain a normalized synthetic spectrum, each function value of the weight function corresponding to a respective position in the spectrum space and being associated with distribution of the plurality of spectra in the spectrum space; and performing the inverse Fourier transform operation on the normalized synthetic spectrum to result in a normalized synthetic hologram.

5 Claims, 8 Drawing Sheets

US 10,042,325 B2

IMAGE PROCESSING METHOD

CROSS-REFERENCE TO RELATED APPLICATION

This application claims priority of Taiwanese Patent Application No. 104113746, filed on Apr. 29, 2015.

FIELD

The disclosure relates to an image processing method, more particularly to an image processing method adapted for synthetic aperture digital holography.

BACKGROUND

A conventional example of superresolution in digital holography is related to placing an diffraction grating behind an object to be observed to bend the diffraction wave at a large angle and recording a synthetic hologram, so as to produce a reconstructed image with spatial resolution which overcomes the diffraction limit of a normal aperture optical system. A conventional synthetic aperture technique associated with digital holography enables generation of a great amount of holographic recording for promoting spatial resolution and phase sensitivity of reconstructed images by using mechanical moving image sensors or spatial-multiplexing methods, such as incoherent light property, spatial light modulator-based method, using an ultra-short pulsed laser combined with a time- and angular-multiplexing methods, applying a time-multiplexing method and a galvo-mirror scanning method. However, the spatial resolution and phase sensitivity of the reconstructed images are desired to be further improved.

SUMMARY

Therefore, an objective of the disclosure is to provide an image processing method used for the synthetic aperture technique of digital holography, so as to improve the spatial resolution and phase sensitivity of reconstructed images by utilizing relatively less holographic recording.

In a first aspect according to the disclosure, an image processing method is configured for processing a plurality of holograms which are associated with an object and which are generated through the synthetic aperture technique. The image processing method is to be implemented by an image processing apparatus, and includes the following steps:

performing a Fourier transform operation on the holograms to result in a plurality of spectra, which correspond respectively to the holograms, in a spectrum space;

calculating a sum of the plurality of spectra to obtain a synthetic spectrum;

multiplying the synthetic spectrum by a weight function associated with the spectrum space to obtain a normalized synthetic spectrum, each function value of the weight function corresponding to a respective position in the spectrum space, and being associated with distribution of the plurality of spectra in the spectrum space; and performing the inverse Fourier transform operation on the normalized synthetic spectrum to result in a normalized synthetic hologram corresponding to the object.

In a second aspect according to the disclosure, an image processing method is configured for processing a plurality of holograms which are associated with an object and which are generated through the synthetic aperture technique. The image processing method is to be implemented by an image processing apparatus, and includes the following steps:

performing a Fourier transform operation on the holograms to result in a plurality of spectra, which correspond respectively to the holograms, in a spectrum space;

multiplying each of the plurality of spectra by a weight function associated with the spectrum space to obtain a plurality of weighted spectra, respectively, each function value of the weight function corresponding to a respective position in the spectrum space and being associated with distribution of the plurality of spectra in the spectrum space;

calculating a sum of the plurality of weighted spectra to obtain a normalized synthetic spectrum; and performing the inverse Fourier transform operation on the normalized synthetic spectrum to result in a normalized synthetic hologram corresponding to the object.

An effect of the disclosure resides in that, by means of the image processing apparatus which generates the normalized synthetic spectrum based on the weight function and the synthetic spectrum, a reconstructed complex image having improved spatial resolution and phase sensitivity is obtainable.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
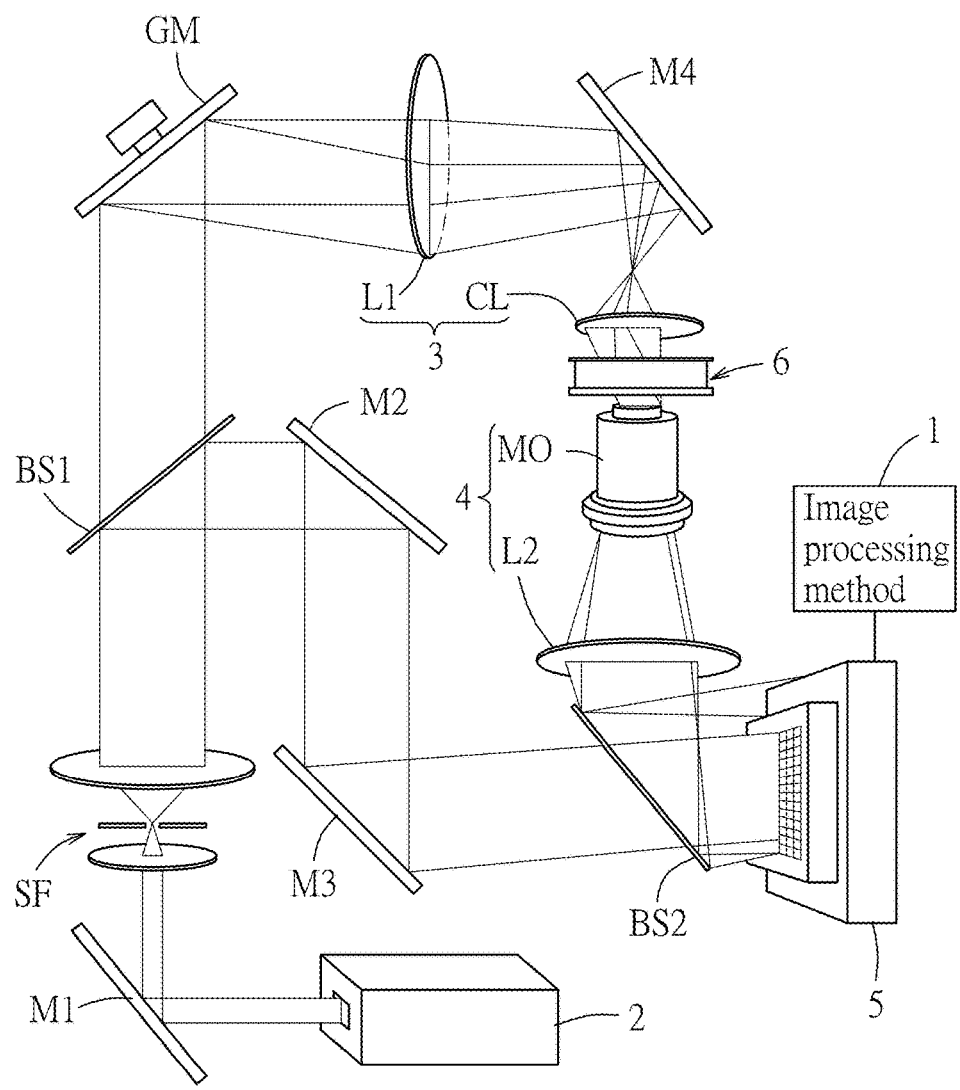
FIG. 1 is a schematic diagram illustrating an optical system adapted for an image processing method according to the disclosure.

Referring to FIG. 1, an embodiment of an image processing method according to the disclosure is configured for processing a plurality of holograms which are associated with an object 6 to be observed. The plurality of holograms are generated by an optical system illustrated in FIG. 1. The optical system includes a diode-pumped solid-state (DPSS) laser source 2, a spatial filter (SF), two beam splitter (BS1 and BS2), a galvo mirror (GM), a first telescopic imaging system 3, a second telescopic imaging system 4, an image sensor 5, and four mirrors (M1 to M4). The first telescopic imaging system 3 includes a lens (L1) having a focal length of 150 millimeters, and an oil-immersed condenser lens (CL) having a numerical aperture of 1.4. A front focal length and a back focal length of the lens (L1) are substantially the same, or alternatively, may have subtle differences. A front focal length and a back focal length of the oil-immersed condenser lens (CL) are substantially the same, or alternatively, may have subtle differences. The second telescopic imaging system 4 includes a lens (L2) having a focal length of 150 millimeters, and a microscopic objective (MO). A front focal length and a back focal length of the lens (L2) are substantially the same, or alternatively, may have subtle differences. A front focal length and aback focal length of the microscopic objective (MO) are substantially the same, or alternatively, may have subtle differences.

The DPSS laser source 2 emits a laser beam having a wavelength of 532 nanometers. The laser beam is expanded and collimated after passing through the spatial filter (SF) to result in a plane wave. The plane wave subsequently travels to the beam splitter (BS1), thus creating two beams, i.e., an object beam and a reference beam. The object beam passes through the galvo mirror (GM) so as to have an angle of incidence of the object beam changed with respect to the object 6, and the angle of incidence of the object beam is then enlarged by the first telescopic imaging system 3. The object beam next passes through the object 6 to be observed so as to form an object wave, which is subsequently magnified by the second telescopic imaging system 4. A beam of the object wave split by the beam splitter (BS2) is projected (in an imaging or non-imaging way) onto the image sensor 5. Concurrently, the reference beam is reflected to the image sensor 5 by the mirrors (M2 and M3), and is maintained at an off-axis angle with respect to the normal incidence object wave so as to realize off-axis holographic recording. It should be ensured that the reference beam is maintained to still eliminate the zero-order and twin image off-axis recording even when the galvo mirror (GM) changes the angle of incidence of the object beam. Furthermore, referring to FIG. 1, the four mirrors (M1 to M4) are merely used to change path directions of laser beams, and implementation of the same should not be limited to the disclosure herein.

It is noted that, by using the optical system which adopts an improved Mach-Zehnder interferometer to realize scanning type synthetic aperture digital holography in a manner of time-multiplexing, holograms resulting from the digital holography can be generated in this embodiment. However, in another embodiment, the holograms may also be generated by virtue of another synthetic aperture technique, such as mechanical moving image sensors or spatial-multiplexing, such as incoherent light property, spatial light modulator-based method, an ultrashort pulsed laser combined with a time- and angular-multiplexing methods, and time-multiplexing method, so as to realize transmission or reflection holographic recording under in-line or off-axis architecture. Generation of the holograms should not be limited to the disclosure herein.

Figure 2:
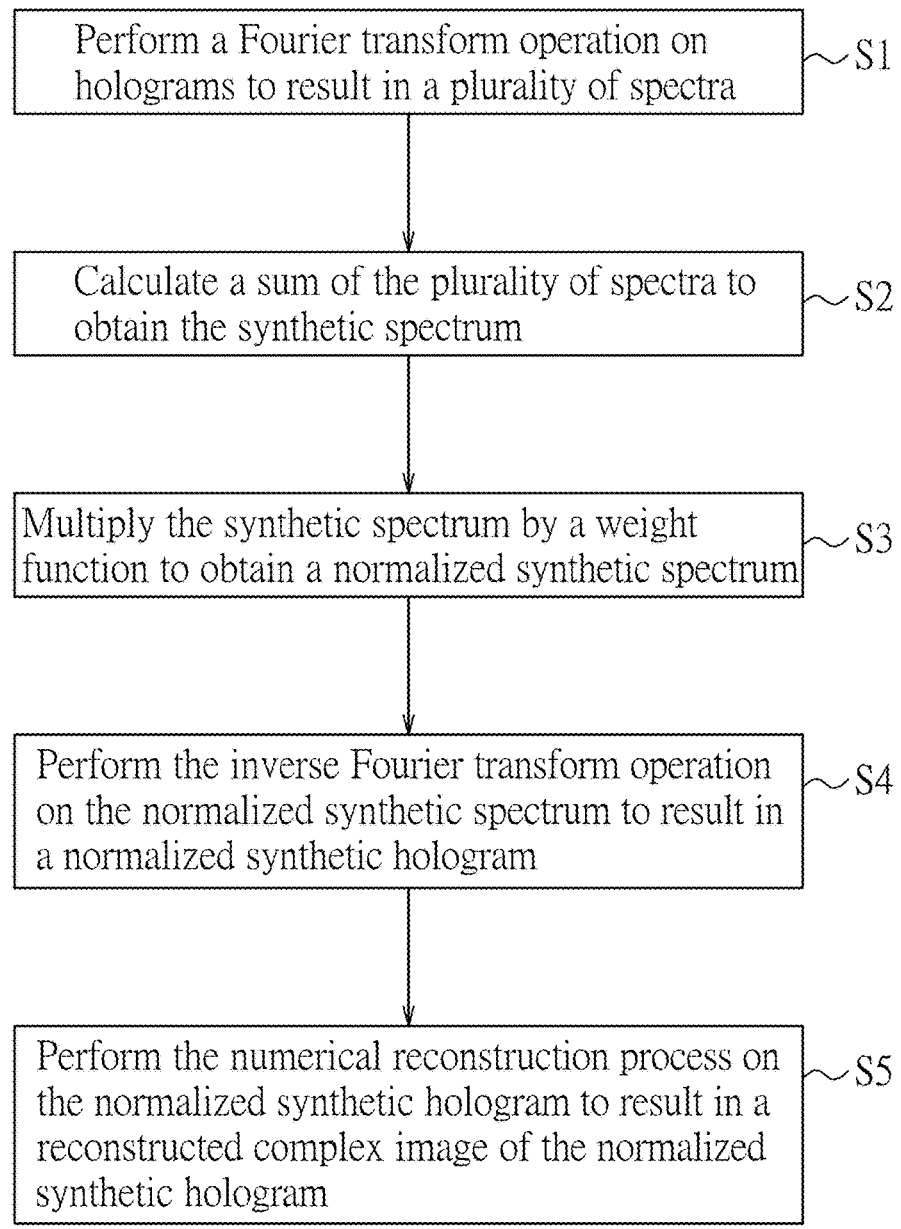
FIG. 2 is a flow chart illustrating an embodiment of the image processing method according to the disclosure.

Referring to FIG. 1 and FIG. 2, the embodiment of the imaging processing method according to the disclosure is to be implemented by an image processing apparatus 1 for processing the holograms generated by the aforementioned optical system. The image processing method includes the following steps.

In step S1, the image processing apparatus 1 is configured to perform a Fourier transform operation on the holograms to result in a plurality of spectra, which correspond respectively to the holograms, in a spectrum space. In this embodiment, the spectrum space of the plurality of spectra is a two-dimensional spectrum plane (U-V). Each of the plurality of spectra is to be represented in a three-dimensional coordinate system (U-V-W) consisting of three coordinate axes U, V, and W. Moreover, coordinates (u, v, w) of each of the plurality of spectra in the three-dimensional coordinates system (U-V-W) is defined as a spectrum position (u, v) on the two-dimensional spectrum plane (U-V) having a corresponding magnitude of w.

Figure 3:
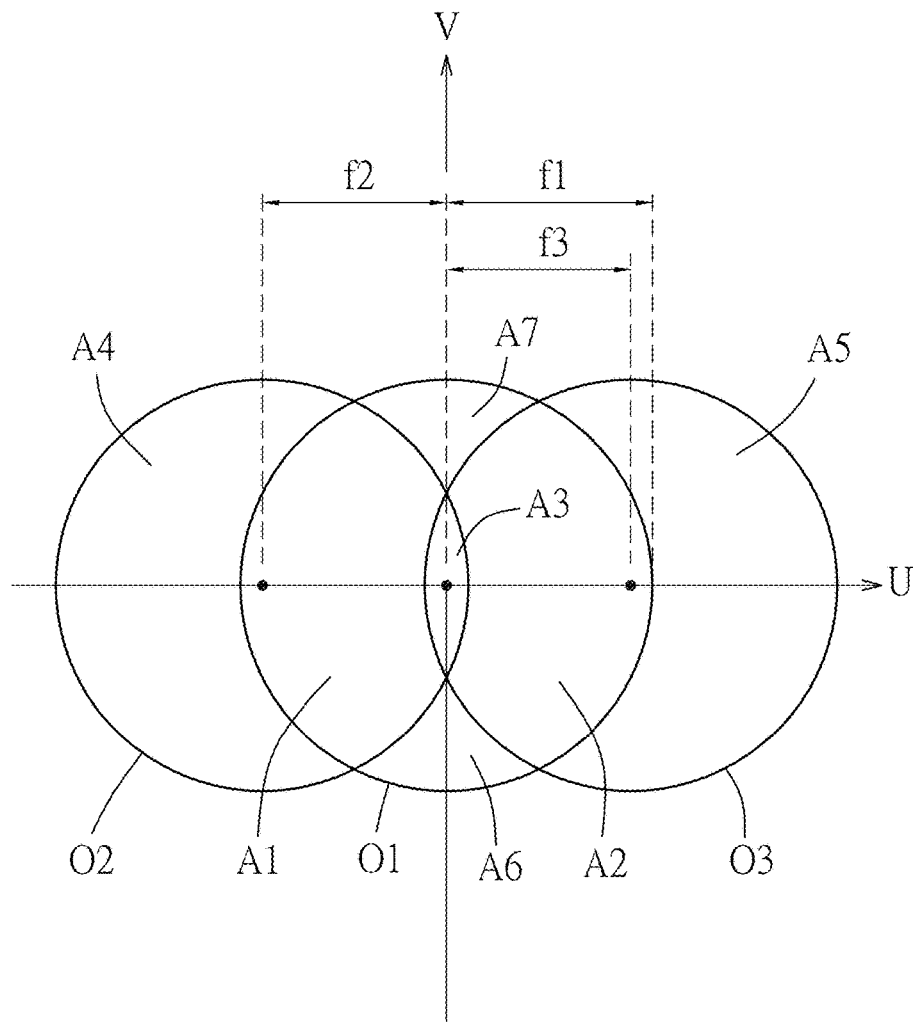
FIG. 3 illustrates distribution of three spectra on a two-dimensional spectrum plane in this embodiment.

Referring to FIG. 3, for convenience of explanation, spectra of three holograms are exemplified to illustrate distribution of the three spectra on the two dimensional spectrum plane (U-V) without showing magnitudes of the three spectra along the coordinate axis W. A range confined by a circular contour (O1) corresponds to a frequency pass band of the spectrum of a hologram which is formed by the object beam at normal incidence onto the object 6 and the reference beam. A range confined by a circular contour (O2) corresponds to a frequency pass band of the spectrum of a hologram which is formed by the oblique object beam by an angle of incidence of $\theta_x$ onto the object 6 and the reference beam. A range confined by a circular contour (O3) corresponds to a frequency pass band of the spectrum of a hologram which is formed by the oblique object beam by an angle of incidence of $-\theta_x$ onto the object 6 and the reference beam. A radius (f1) of each of the circular contours (O1 to O3) is equal to a cut-off frequency of the optical system. A distance (f2) between centers of the circular contours (O1 and O2), and a distance (f3) between centers of the circular contours (O1 and O3) are both equal to $\sin \theta_x/\lambda$. In other words, each of the distances (f2 and f3) is a phase shift of the spectrum that corresponds to the range confined by a respective one of the circular contours (O2 and O3) from the spectrum that corresponds to the range confined by the circular contour (O1). $\lambda$ represents the wavelength of the laser beam and is equal to 532 nanometers.

In step S2, the image processing apparatus 1 is configured to calculate a sum of the plurality of spectra to obtain the synthetic spectrum. Referring once again to FIG. 3, a frequency pass band where the synthetic spectrum is distributed on the two dimensional spectrum plane (U-V) is a range confined by a union set of the circular contours (O1 to O3). Each spectrum position (u, v) in the frequency pass band where the synthetic spectrum is distributed corresponds to a respective magnitude which is equal to a sum of magnitudes of the spectra of the holograms corresponding to the spectrum position (u, v) on the two dimensional spectrum plane (U-V).

In step S3, the image processing apparatus 1 is configured to multiply the synthetic spectrum by a weight function associated with the spectrum space to obtain a normalized synthetic spectrum. Each function value of the weight function corresponds to a respective position in the spectrum space, and is associated with distribution of the plurality of spectra in the spectrum space. Specifically, within the frequency pass band where the synthetic spectrum is distributed, the function value of the weight function corresponding to the spectrum position (u, v) is equal to $$\frac{a}{N(u, v)},$$

in which a is a real number greater than zero and smaller than or equal to one to serve as an adjustment factor, and N(u, v) is a positive integer and is defined as a number of the plurality of spectra whose frequency pass bands cover the spectrum position (u, v). The function value of the weight function corresponding to a spectrum position beyond the frequency pass band where the synthetic spectrum is distributed is equal to zero. In this embodiment, a=1 is given as an example for explanation purposes.

Referring once again to FIG. 3, more specifically, when the spectrum position (u, v) is in an area A4, which is covered by the frequency pass band of only one spectrum, i.e., the spectrum corresponding to the circular contour O2, the function value of the weight function is equal to one. When the spectrum position (u, v) is in an area A5, which is covered by the frequency pass band of only one spectrum, i.e., the spectrum corresponding to the circular contour O3, the function value of the weight function is equal to one. When the spectrum position (u, v) is in areas A6 and A7, which are covered by the frequency pass band of only one spectrum, i.e., the spectrum corresponding to the circular contour O1, the function value of the weight function is equal to one. When the spectrum position (u, v) is in an area A1, which is covered by the frequency pass bands of two spectra, i.e., the two spectra corresponding to the circular contours O1 and O2, the function value of the weight function is equal to one-half. When the spectrum position (u, v) is in an area A2, which is covered by the frequency pass bands of two spectra, i.e., the two spectra corresponding to the circular contours O1 and O3, the function value of the weight function is equal to one-half. When the spectrum position (u, v) is in an area A3, which is covered by the frequency pass bands of three spectra, i.e., the three spectra corresponding to the circular contours O1 to O3, the function value of the weight function is equal to one-third. When the spectrum position (u, v) is in a frequency pass band outside of the areas A1 to A7, the function value of the weight function is equal to zero.

Referring to FIG. 1 and FIG. 2, in step S4, the image processing apparatus 1 is configured to perform the inverse Fourier transform operation on the normalized synthetic spectrum to result in a normalized synthetic hologram corresponding to the object 6. It is noted that the order of step S2 and step S3 may be switched. In such case, each of the plurality of spectra is multiplied by the weight function to obtain a plurality of weighted spectra, respectively, and a sum of the plurality of weighted spectra is calculated to obtain the equivalent normalized synthetic spectrum.

In step S5, the image processing apparatus 1 is configured to perform the numerical reconstruction process on the normalized synthetic hologram to result in a reconstructed complex image of the normalized synthetic hologram. Since the numerical reconstruction process has been known to the skilled person in the relevant art, and since this disclosure does not focus on the numerical reconstruction process, detailed descriptions of the same are omitted herein for the sake of brevity.

Figure 4:
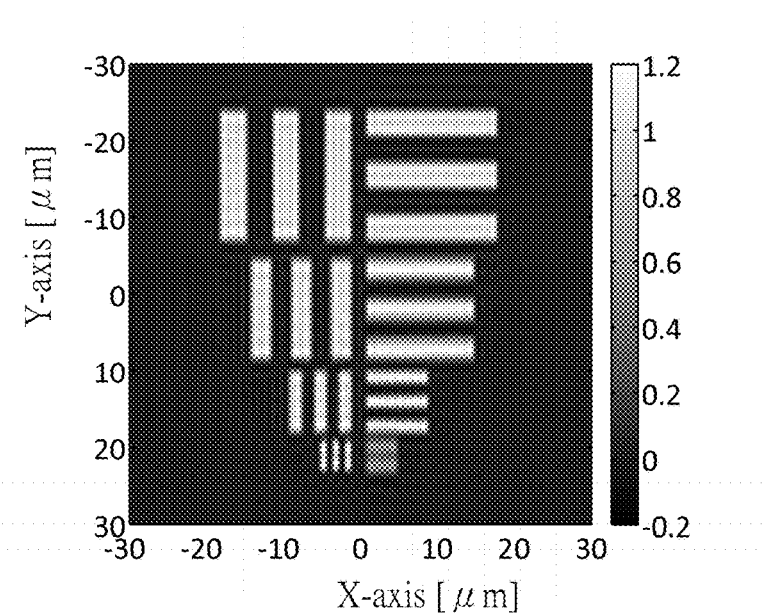
FIG. 4 is a simulation result of a reconstructed amplitude image of a normalized synthetic hologram in this embodiment.
Figure 8:
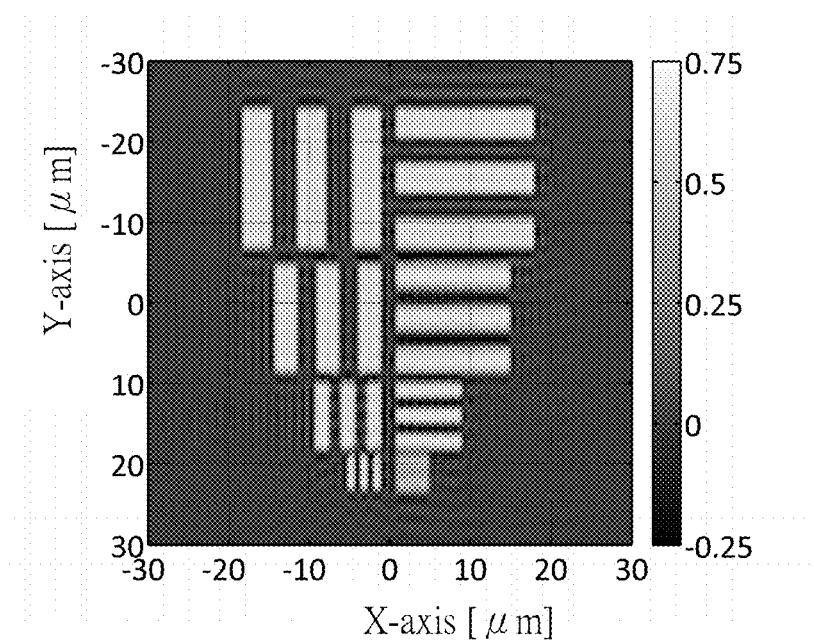
FIG. 8 is a simulation result of a reconstructed phase image of the normalized synthetic hologram in this embodiment.
Figure 11:
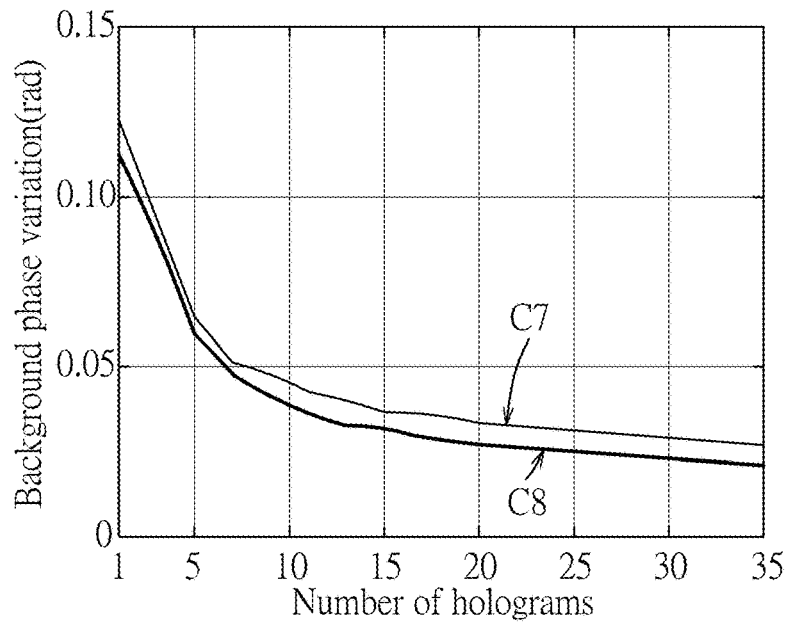
FIG. 11 is a plot of the background phase variation versus a number of holograms used to generate a reconstructed phase image.
Figure 12:
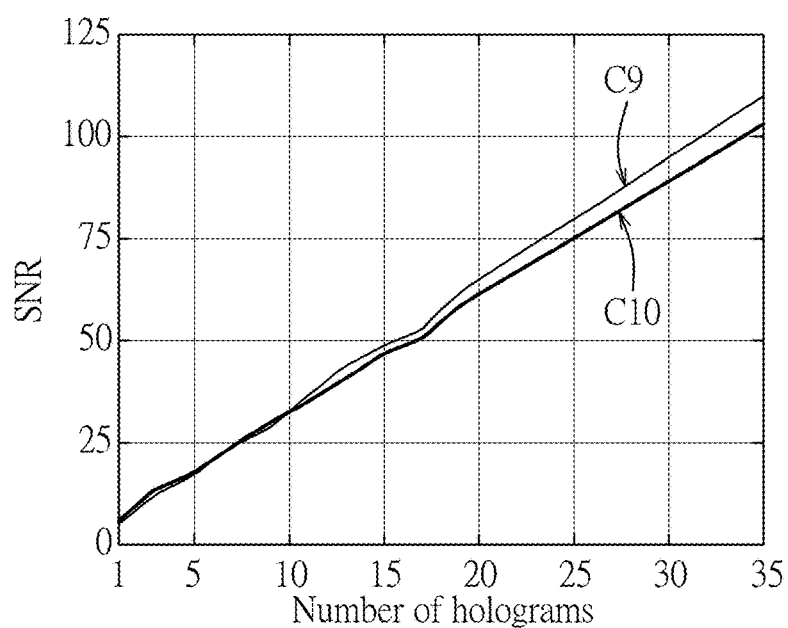
FIG. 12 is a plot of the signal-to-noise ratio (SNR) versus the number of holograms used to generate a reconstructed phase image.

Referring to FIG. 4 and FIG. 8, after three holograms are generated by the optical system illustrated in FIG. 1, reconstructed complex images are obtained by the image processing apparatus 1 which performs the imaging processing method according to the disclosure. When different numbers of holograms are generated by using the optical system illustrated in FIG. 1, analyses of reconstructed complex images obtained by the image processing apparatus 1 which performs the imaging processing method are illustrated in FIG. 11 and FIG. 12. The object 6 to be observed includes line segments having widths of 3.4 micrometers, 2.6 micrometers, 1.6 micrometers and 0.8 micrometers to be illustrated in a reconstructed amplitude image and a reconstructed phase image.

Figure 5:
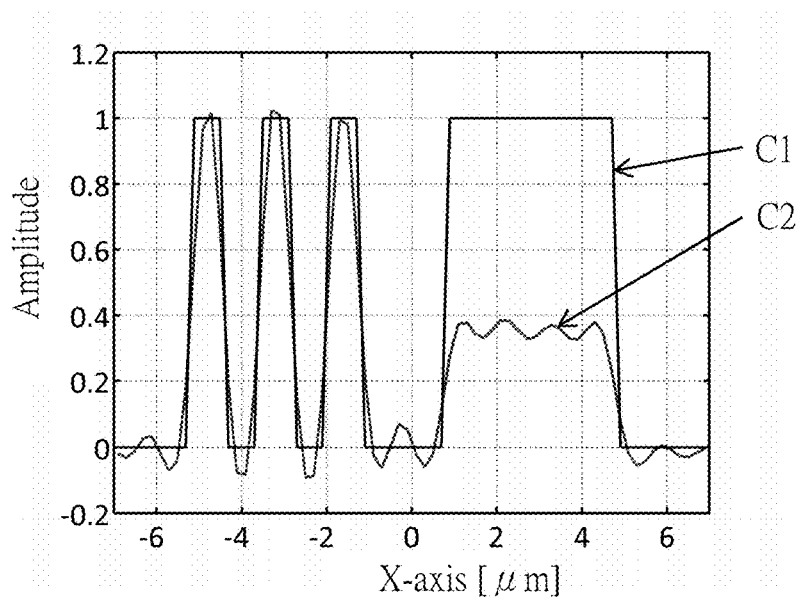
FIG. 5 is a partial cross-section profile of the reconstructed amplitude image of the normalized synthetic hologram (for the sake of brevity, hereinafter referred to as "the reconstructed amplitude image of the normalized synthetic hologram") obtained by this embodiment.

FIG. 4 is a simulation result of the reconstructed amplitude image of the reconstructed complex image of the normalized synthetic hologram (for the sake of brevity, hereinafter referred to as "the reconstructed amplitude image of the normalized synthetic hologram") associated with the object 6, in which an X-axis and a Y-axis specify dimensions in a two-dimensional space and have a unit of micrometer. Different gray values represent the magnitudes of the reconstructed amplitude image of the normalized synthetic hologram at corresponding positions in the two-dimensional space. FIG. 5 is a partial cross-section profile of the reconstructed amplitude image of the normalized synthetic hologram which illustrates amplitude variation corresponding to positions at Y=22 and −7≤X≤7 in the reconstructed amplitude image of the normalized synthetic hologram of FIG. 4. In FIG. 5, a curve (C1) shows amplitude excursion of a target image of object 6, and a curve (C2) shows amplitude variation of the reconstructed amplitude image of the normalized synthetic hologram. The target image of object 6 is a computer simulation image of the object 6.

Figure 6:
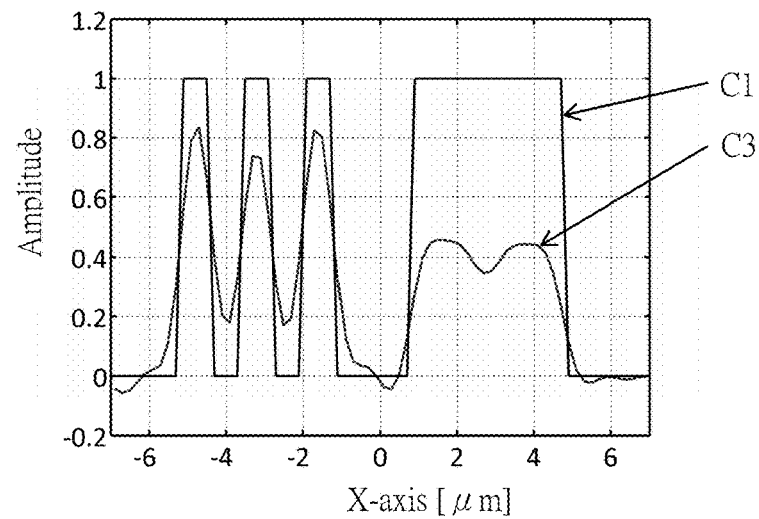
FIG. 6 is a partial cross-section profile of a reconstructed amplitude image of a synthetic hologram obtained by a conventional method.

FIG. 6 is similar to FIG. 5, and is a partial cross-section profile of a reconstructed amplitude image of a synthetic hologram generated by a conventional method, in which the synthetic spectrum obtained in step S2 of this embodiment is inversely Fourier transformed to result in the synthetic hologram (i.e., without spectrum normalization by the weight function). The curve (C1) in FIG. 6 also shows the amplitude excursion of the target image of object 6, and a curve (C3) shows amplitude variation of the reconstructed amplitude image of the synthetic hologram.

Figure 7:
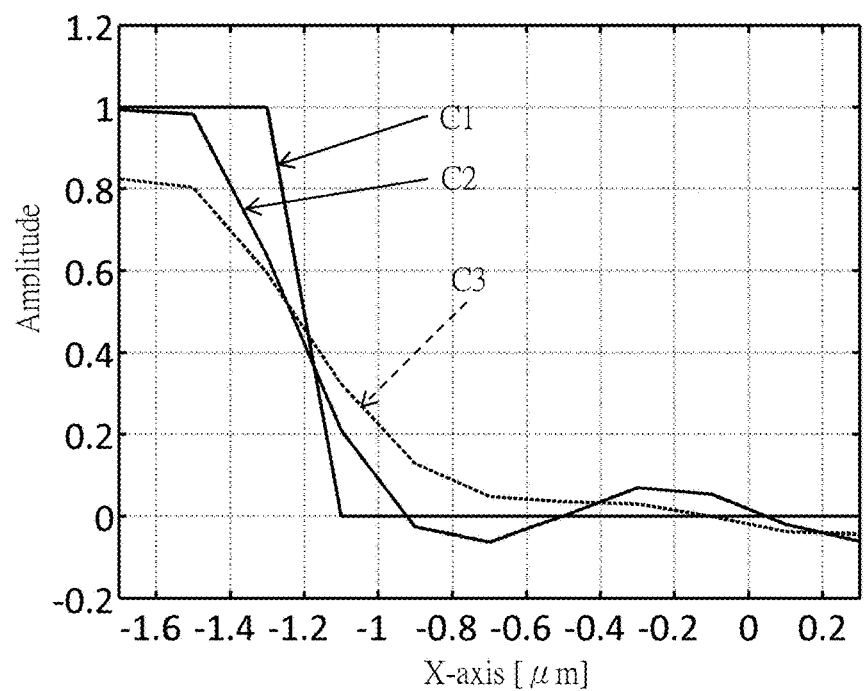
FIG. 7 is a partial enlarged view of a combined drawing of FIG. 5 and FIG. 6.

Referring to FIG. 7 in combination with FIG. 5 and FIG. 6, FIG. 7 is a partial enlarged view of a combined drawing positions of FIG. 5 and FIG. 6 between −1.7 micrometers and 0.3 micrometers. It is clear from FIG. 5 to FIG. 7 that, at the edge of the line segment of the object 6 at Y=22 and X=−1.5, a boundary slope of the reconstructed amplitude image of the normalized synthetic hologram generated by the image processing method according to the disclosure, when compared with a boundary slope of the reconstructed amplitude image of the synthetic hologram generated by the conventional method, is a closer approximate to a boundary slope of the target image of object 6.

Figure 9:
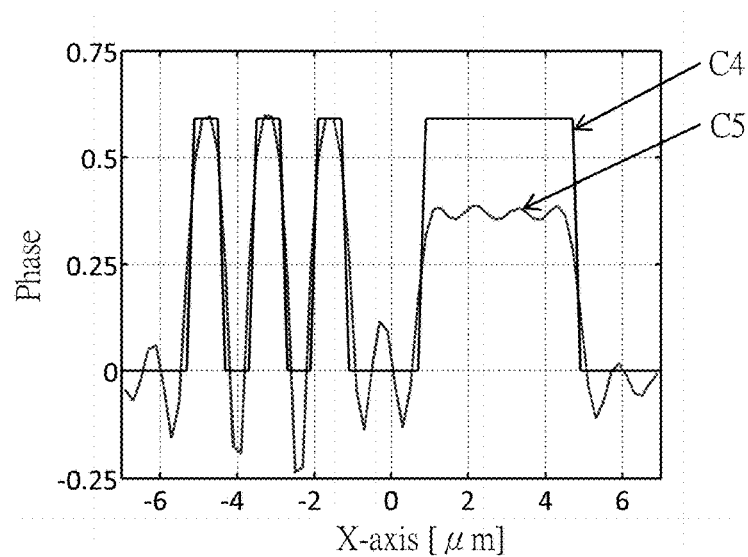
FIG. 9 is a partial cross-section profile of the reconstructed phase image of the normalized synthetic hologram obtained by this embodiment.

Referring to FIG. 8 and FIG. 9, FIG. 8 is a simulation result of the reconstructed phase image of the reconstructed complex image of the normalized synthetic hologram (for the sake of brevity, hereinafter referred to as "the reconstructed phase image of the normalized synthetic hologram"), in which an X-axis and a Y-axis specify dimensions in a two-dimensional space and have a unit of micrometer. Different gray values represent phase values of the reconstructed phase image of the normalized synthetic hologram at corresponding positions in the two-dimensional space. FIG. 9 is a partial cross-section profile of the reconstructed phase image of the normalized synthetic hologram which illustrates phase step level corresponding to positions at Y=22 and −7≤X≤7 in the reconstructed phase image of the normalized synthetic hologram of FIG. 8. In FIG. 9, a curve (C4) shows phase step level of the target image of object 6, and a curve (C5) shows phase variation of the reconstructed phase image of the normalized synthetic hologram.

Figure 10:
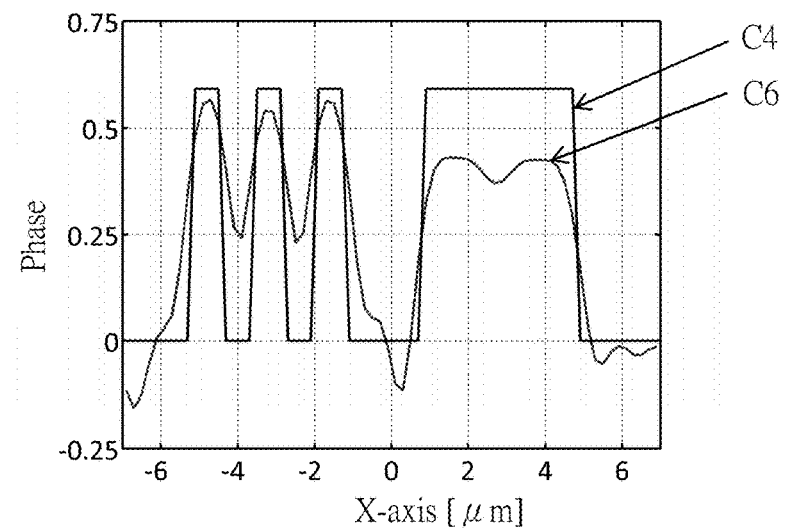
FIG. 10 is a partial cross-section profile of a reconstructed phase image from the synthetic hologram obtained by the conventional method.

Referring to FIG. 10, FIG. 10 is similar to FIG. 9, and is a partial cross-section profile of a reconstructed phase image of the synthetic hologram generated by the conventional method. The curve (C4) in FIG. 10 also shows the phase step level of the target image of object 6, and a curve (C6) shows phase variation of the reconstructed phase image of the synthetic hologram.

Referring to FIG. 9 in combination with FIG. 10, it is clear that, between −6 and 0 along the X-axis where frequent phase variation occurs, the phase variation of the reconstructed phase image of the normalized synthetic hologram generated by the image processing method according to the disclosure, when compared with the phase variation of the reconstructed phase image of the synthetic hologram generated by the conventional method, is a closer approximate to the phase step level of the target image of object 6. Accordingly, an effect of high-frequency enhancement is achieved. On the other hand, between 0 and 6 along the X-axis where infrequent phase variation occurs, the phase variation of the reconstructed phase image of the normalized synthetic hologram generated by the image processing method according to the disclosure, when compared with the phase variation of the reconstructed phase image of the synthetic hologram generated by the conventional method, is a closer approximate to the phase step level of the target image of object 6. Accordingly, an effect of low-frequency suppression is achieved.

Based on the aforementioned analysis from FIG. 4 to FIG. 10, it is clear that the reconstructed amplitude image and the reconstructed phase image of the normalized synthetic hologram generated by the image processing method according to the disclosure, when compared with the reconstructed amplitude image and the reconstructed phase image of the synthetic hologram generated by the conventional method, have improved spatial resolution.

FIG. 11 illustrates a relationship between background phase variation and a number of holograms used to generate a reconstructed phase image. A curve (C7) and a curve (C8) respectively illustrate the background phases of the reconstructed phase image of a respective one of the normalized synthetic hologram generated by the image processing method according to the disclosure, and the synthetic hologram generated by the conventional method. Specifically, the horizontal axis of FIG. 11 represents different numbers of the holograms to be synthesized for generation of the reconstructed phase image, and the vertical axis of FIG. 11 represents the background phase variation having a unit of radian (rad.). The background phase variation is calculated by first subtracting a part at an original position of the object 6 from a corresponding phase image, and then performing standard deviation analysis upon the remaining part of the corresponding phase image.

FIG. 12 illustrates a relationship between the signal-to-noise ratio (SNR) and the number of holograms used to generate a reconstructed phase image. A curve (C9) and a curve (C10) respectively illustrate the SNR of the reconstructed phase image of a respective one of the normalized synthetic hologram generated by the image processing method according to the disclosure, and the synthetic hologram generated by the conventional method. Specifically, the horizontal axis of FIG. 12 represents different numbers of the holograms to be synthesized for generation of the reconstructed phase image, and the vertical axis of FIG. 12 represents the SNR. The SNR is calculated by first regarding apart at the original position of the object 6 in the corresponding phase image as a signal, and next regarding the remaining part of the corresponding phase image as noise, and finally calculating a ratio of the signal to the noise.

From the comparisons shown in FIG. 11 and FIG. 12, it is apparent that no matter how many holograms are used for generation of the reconstructed phase image, the reconstructed phase image of the normalized synthetic hologram generated by the image processing method according to the disclosure, when compared with the reconstructed phase image of the synthetic hologram generated by the conventional method, has improved SNR of its reconstructed phase image and has better phase sensitivity with subtle influence upon the background phase variation of the reconstructed phase image.

To sum up, by means of the image processing apparatus 1 which implements the image processing method, the plurality of holograms generated by the synthetic aperture technique are first transformed into spectrum space, the normalized synthetic spectrum is next calculated based on the weight function, and the normalized synthetic spectrum is then transformed into the normalized synthetic hologram which is finally reconstructed to result in the reconstructed complex image, so as to realize reconstruction of image having better spatial resolution and phase sensitivity by using a small amount of hologram recording.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An image processing method for processing a plurality of holograms which are associated with an object, the image processing method to be implemented by an optical system and an image processing apparatus, the optical system including a laser source, a spatial filter, a first beam splitter, a galvo mirror, a first telescopic imaging system, a second telescopic imaging system, a second beam splitter, an image sensor and at least one mirror, the image processing method comprising the steps of:

emitting, by the laser source, a laser beam;

expanding and collimating, by the spatial filter, the laser beam to result in a plane wave;

splitting, by the first beam splitter, the plane wave to create an object beam and a reference beam;

changing, by the galvo mirror, an angle of incidence of the object beam with respect to the object;

enlarging, by the first telescopic imaging system, the angle of incidence of the object beam which then passes through the object to form an object wave;

magnifying, by the second telescopic imaging system, the object wave;

splitting, by the second beam splitter, the object wave thus magnified which is then projected onto an image sensor;

reflecting, by the at least one mirror, the reference beam to the image sensor;

generating, by the optical system which adopts a digital holography, the holograms according to the reference beam and the object wave on the image sensor;

performing a Fourier transform operation on the holograms to result in a plurality of spectra, which correspond respectively to the holograms, in a spectrum space;

calculating a sum of the plurality of spectra to obtain a synthetic spectrum;

multiplying the synthetic spectrum by a weight function associated with the spectrum space to obtain a normalized synthetic spectrum, each function value of the weight function corresponding to a respective position in the spectrum space, and being associated with distribution of the plurality of spectra in the spectrum space;

performing the inverse Fourier transform operation on the normalized synthetic spectrum to result in a normalized synthetic hologram corresponding to the object; and performing the numerical reconstruction process on the normalized synthetic hologram to result in a reconstructed complex image of the normalized synthetic hologram with improved spatial resolution and phase sensitivity.

2. The image processing method according to claim 1, wherein the spectrum space of each of the plurality of spectra, the synthetic spectrum and the normalized synthetic spectrum is a two-dimensional spectrum plane, each of the plurality of spectra, the synthetic spectrum and the normalized synthetic spectrum to be represented in a three-dimensional (U-V-W) coordinates system, coordinates (u, v, w) of each of the plurality of spectra, the synthetic spectrum and the normalized synthetic spectrum in the three-dimensional (U-V-W) coordinates system being defined as a spectrum position (u, v) on the two-dimensional spectrum plane having a corresponding magnitude of w.

3. The image processing method according to claim 2, wherein:

each of the plurality of spectra and the synthetic spectrum is distributed in a respective frequency pass band on the two-dimensional spectrum plane; and in the step of multiplying the synthetic spectrum by a weight function, within the frequency pass band where the synthetic spectrum is distributed, the function value of the weight function corresponding to the spectrum position (u, v) is equal to $$\frac{a}{N(u, v)},$$

in which a is a real number greater than zero and not greater than one, and N(u, v) is a positive integer and is defined as a number of the plurality of spectra whose frequency pass bands cover the spectrum position (u, v), the function value of the weight function corresponding to a spectrum position beyond the frequency pass band where the synthetic spectrum is distributed being equal to zero.

4. The image processing method according to claim 3, wherein, in the step of multiplying the synthetic spectrum by a weight function, a is equal to one.

5. An image processing method for processing a plurality of holograms which are associated with an object and which are generated through the synthetic aperture technique, the image processing method to be implemented an optical system and an image processing apparatus, the optical system including a laser source, a spatial filter, a first beam splitter, a galvo mirror, a first telescopic imaging system, a second telescopic imaging system, a second beam splitter, an image sensor and at least one mirror, the image processing method comprising the steps of:

emitting, by the laser source, a laser beam;

expanding a collimating, by the spatial filter, the laser beam to result in a plane wave; splitting, by the first beam splitter, the plane wave to create an object beam and a reference beam;

changing, by the galvo mirror, an angle of incidence of the object beam with respect to the object; enlarging, by the first telescopic imaging system, the angle of incidence of the object beam which then passes through the object to form an object wave;

magnifying, by the second telescopic imaging system, the object wave; splitting, by the second beam splitter, the object wave thus magnified which is then projected onto an image sensor;

reflecting, by the at least one mirror, the reference beam to the image sensor; generating, by the optical system which adopts a digital holography, the holograms according to the reference beam and the object wave on the image sensor;

performing a Fourier transform operation on the holograms to result in a plurality of spectra, which correspond respectively to the holograms, in a spectrum space;

multiplying each of the plurality of spectra by a weight function associated with the spectrum space to obtain a plurality of weighted spectra, respectively, each function value of the weight function corresponding to a respective position in the spectrum space, and being associated with distribution of the plurality of spectra in the spectrum space; calculating a sum of the plurality of weighted spectra to obtain a normalized synthetic spectrum;

performing the inverse Fourier transform operation on the normalized synthetic spectrum to result in a normalized synthetic hologram corresponding to the object; and performing the numerical reconstruction process on the normalized synthetic hologram to result in a reconstructed complex image of the normalized synthetic hologram with improved spatial resolution and phase sensitivity.

* * * * *